US010929912B2

(12) United States Patent
Tapia

(10) Patent No.: US 10,929,912 B2
(45) Date of Patent: Feb. 23, 2021

(54) VIRTUAL MARKETPLACE FOR DISTRIBUTED TOOLS IN AN ENTERPRISE ENVIRONMENT

(71) Applicant: TUPL, Inc., Snoqualmie, WA (US)

(72) Inventor: Pablo Tapia, Snoqualmie, WA (US)

(73) Assignee: Tupl Inc., Bellevue, WA (US)

( * ) Notice: Subject to any disclaimer, the term of this patent is extended or adjusted under 35 U.S.C. 154(b) by 768 days.

(21) Appl. No.: 15/077,823

(22) Filed: Mar. 22, 2016

(65) Prior Publication Data

US 2017/0278171 A1 Sep. 28, 2017

(51) Int. Cl.
| | | |
|---|---|---|
| *G06Q 30/00* | (2012.01) | |
| *G06Q 10/00* | (2012.01) | |
| *G06Q 20/00* | (2012.01) | |
| *G06Q 30/06* | (2012.01) | |
| *G06Q 30/08* | (2012.01) | |
| *G06Q 20/22* | (2012.01) | |
| *G06Q 10/06* | (2012.01) | |
| *G06Q 20/40* | (2012.01) | |

(52) U.S. Cl.
CPC ... *G06Q 30/0631* (2013.01); *G06Q 10/06393* (2013.01); *G06Q 20/29* (2013.01); *G06Q 20/405* (2013.01); *G06Q 30/0643* (2013.01); *G06Q 30/08* (2013.01)

(58) Field of Classification Search
CPC ........ G06Q 10/00–50/00; G06Q 20/29; G06Q 20/405; G06Q 30/0631; G06Q 30/06393; G06Q 30/08; G06Q 30/0643
USPC .............................................. 705/7.11–7.42
See application file for complete search history.

(56) References Cited

U.S. PATENT DOCUMENTS 9,111,219 B1 8/2015 Mohla et al.
2002/0198882 A1 12/2002 Linden et al.
(Continued)

FOREIGN PATENT DOCUMENTS

| EA | 009552 B1 | 2/2008 |
| WO | 2013072232 A1 | 5/2013 |
| WO | 2013169245 A2 | 11/2013 |

OTHER PUBLICATIONS

International Search Report & Written Opinion dated Aug. 22, 2017 for PCT Application No. PCT/US2017/023610, 14 pages.
(Continued)

*Primary Examiner* — Eric W Stamber
*Assistant Examiner* — Mustafa Iqbal

(57) ABSTRACT

A distributed tool virtual marketplace may offer end users the ability to acquire tools that are compatible with an enterprise operating system platform. The virtual marketplace may determine one or more tools that are implemented on the enterprise operating system platform. The enterprise operating system platform may be provided to the end user by an operator of the marketplace. The tools including a tool that may be used for evaluating a performance of an entity. The virtual marketplace may further ascertain data that are processed or generated by the tools that are implemented on the enterprise operating system platform. The virtual marketplace may additionally determine functionalities that are used or provided by the tools. Accordingly, the distributed tool virtual marketplace may provide a recommendation of associated tools from the distributed tool virtual marketplace that have at least one dependency relationship with the tools.

21 Claims, 6 Drawing Sheets

(56) References Cited

U.S. PATENT DOCUMENTS

| | | |
|---|---|---|
| 2013/0152047 A1 | 6/2013 | Moorthi et al. |
| 2013/0346268 A1* | 12/2013 | Pereira .................. G06Q 10/10 |
| | | 705/34 |
| 2014/0316845 A1* | 10/2014 | Nayak .................... G06Q 10/10 |
| | | 705/7.28 |
| 2015/0046228 A1* | 2/2015 | Lamb ............... G06Q 10/06393 |
| | | 705/7.39 |
| 2015/0112739 A1* | 4/2015 | Pathak ................ G06Q 10/063 |
| | | 705/7.11 |
| 2015/0199182 A1 | 7/2015 | Erickson et al. |
| 2016/0041591 A1 | 2/2016 | Ricket |
| 2016/0179498 A1* | 6/2016 | Das .......................... G06F 8/65 |
| | | 717/171 |

OTHER PUBLICATIONS

European Search Report and Written Opinion dated Aug. 27, 2019 for European Application No. 17771067.0.

* cited by examiner

VIRTUAL MARKETPLACE FOR DISTRIBUTED TOOLS IN AN ENTERPRISE ENVIRONMENT

BACKGROUND

Tools in the form of applications or data may be used to perform many functions, such as evaluating or assisting in the evaluation of the performances of entities to ensure that operational goals are being met in an efficient manner. In some examples, the entities may include networks, such as a wireless carrier network that delivers mobile communication services to end users. In other examples, the entities may include systems, such as a utility company that delivers a utility service to commercial and residential customers, or a financial company that provides financial services to customers. Such tools may be used to detect and diagnose entity performance problems so that an expected level of service is maintained. A tool may monitor multiple sets of performance metrics, such as end user metrics and resource metrics. End user metrics may measure the performances experienced by end users of an entity. Resource metrics may measure computational or other resources used by an entity under a work load, in order to identify resource inadequacies and performance bottlenecks.

Some tools may be configured to execute on an enterprise operating system platform. The enterprise operating system platform may provide an environment for executing or implementing the tools. Further, the enterprise operating system platform may be responsible for extracting performance data from the entity through the use of software agents. For example, in a scenario in which the entity is a wireless carrier network, the enterprise operating system platform may interface with software agents that monitor user devices and the core network functions to obtain performance data about the entity.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 4 is a flow diagram of an illustrative process for selectively presenting tools that are available for distribution to an end user by the virtual marketplace for distributed tools.

DETAILED DESCRIPTION

Figure 1:
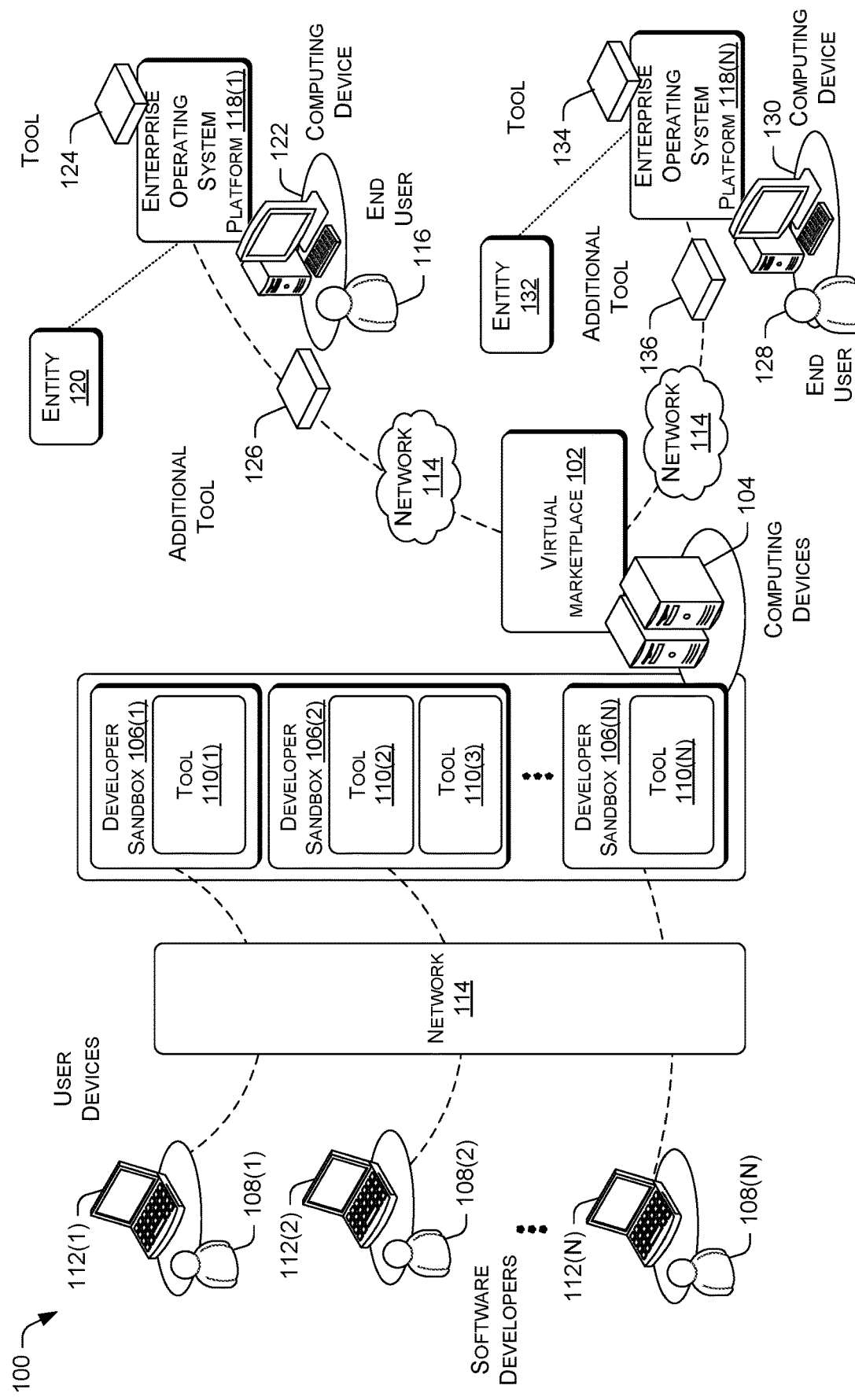
FIG. 1 is a schematic diagram of an architecture for implementing various embodiments of a virtual marketplace for distributed tools.

The disclosure is directed to implementations of a virtual marketplace for distributed tools that enables software developers to submit tools for distribution to end users. The tools may be designed for use in an enterprise environment with an enterprise operating system platform to perform various functions. In some scenarios, the tools may include performance management applications, applications that process performance management data, utilities and other software that make the performance tools operational (e.g., data plugins), and general utilities commonly used by any other application that facilitates performance management. The virtual marketplace for distributed tools is a virtual store that distributes tools that perform multiple functions, such as providing performance evaluations of entities. In some examples, the entities may include networks, such as a wireless carrier network that delivers mobile communication services to end users. In other examples, the entities may include systems, such as a utility company that delivers a utility service to commercial and residential customers, or a financial company that provides financial services to customers. In these scenarios, the tools may include software applications that perform various functions related to evaluating the performance of the entities, such functions may include data reformatting, data conversion, data aggregation, data correlation, key performance indicator (KPI) generation, and/or so forth. In other scenarios, the tools may include applications that distribute or manage other services and data for enterprise environments.

The virtual marketplace for distributed tools may be operated by an operator that also distributes installations of an enterprise operating system platform to end users. The enterprise operating system platform may provide an operating system environment for executing the tools. In some instances, the enterprise operating system platform may provide services such as key performance indicator (KPI) calculation or aggregation, alert generation, implementing a common data model, deployment and maintenance of utility applications, and/or so forth. In other instances, the enterprise operating system may also perform a data collection function for extracting performance data from an entity through the use of software agents. Accordingly, in order for a tool to be eligible for distribution through the virtual marketplace for distributed tools, the operator of the marketplace may implement a tool testing and certification process for the tool. The tool testing and certification process is designed to ensure that the tool is able to function correctly in the operating system environment and perform the specified performance monitoring functions.

In various embodiments, the tools may be developed to interact with each other as interrelated tools rather than act as standalone tools. In one scenario, a first tool may be developed to aggregate data from multiple sources, while a second tool may be designed to generate KPIs from the aggregated data. In such a scenario, there may be a third tool that correlates the KPIs that are generated by the second tool with performance data from additional sources to generate a comprehensive performance indicator. In another scenario, a first tool may generate analytics on one set of KPIs. Subsequently, a second tool may leverage the analytics generated by the first tool to create a plan for improving a particular process that is implemented on a network. A third tool may leverage the plan from the second tool to perform modifications on the network to optimize the particular process. Accordingly, for each installation of the enterprise operating system platform that is in use by a customer account, the virtual marketplace for distributed tools may store state information regarding the tools that are already being used in conjunction with the platform.

Additionally, the virtual marketplace for distributed tools may further store the status data of tools that are available for acquisition through the marketplace. For example, the status data of a tool may indicate whether the tool is a new tool, a new version of an existing tool, or whether the tool is available or withdrawn from the marketplace. The status data of the tool may further indicate the tool functionalities and/or input data provided by other tools that the tool is dependent on to carry out its processing functions. Alternatively or concurrently, the status data of the tool may indicate the output data and functionalities that the tool is able to generate. In this way, when an end user access the virtual marketplace for distributed tools with the customer account, the marketplace may present one or more related tools that have dependency relationships to the tools that are already in use by the end user. The dependency relationship may be an input dependency in which one tool is able to use the functionalities or data that are provided by another tool, or an output dependency in which one tool is able to provide functionalities or data to be used by another tool. Dependency relationships may manifest themselves as dependencies on a version of a tool or the data format of the tool. Other dependency relationships manifest themselves as the availability of data in the first place. For example, a tool may depend on a data plugin that provides access to a specific KPI source. In this way, the end user may be kept up to date on the latest available tools for improving the performance management abilities of the end user.

Software developers may use developer sandboxes that are provided by the operator of the virtual marketplace for distributed tools to develop and test the tools. A developer sandbox is a software code development environment that isolates new software code from a production environment and/or other development environments. The developer sandboxes may be specific to the types of entity. For example, a developer sandbox for an entity that is a wireless communication carrier may be different from a developer sandbox for an entity that is water utility service provider. Each of the developer sandbox may provide simulated data for processing by the tools being developed. The use of developer sandbox may ensure that the developed tools are fully compatible with the enterprise operating system platform and software bugs are remedied.

Once a tool is submitted by a software developer to the operator of the virtual marketplace for distributed tools, the operator may use a test environment to validate the tool. In various embodiments, the test environment may include test data in the form of raw events and complex events that are to be processed by the tools. Accordingly, the tool may be deemed to be validated when the tool generates test results that are in line with expected results or within predetermined acceptable value thresholds. Subsequently, the tool may be released, i.e., made available for distribution via the virtual marketplace for distributed tools. The distribution of a tool for use by an end user may involve the end user purchase a license or a right to use the tool. The purchase may be carried out under one of multiple arrangements and payment terms, in which the arrangements may include a direct payment at a set price, an auction, a reverse auction, etc.

In some embodiments, the test result obtained from each successful validation of a tool for an entity may be integrated into the test data for carrying out subsequent validations of tools for the same type of entities. In other embodiments, test results from preliminary testing of tools for an entity may also be integrated into the test data to carry out subsequent tool validations of tools for the same type of entities. In this way, the test environment may be constantly supplied with additional test data that is otherwise unavailable or difficult to simulate.

The virtual marketplace for distributed tools may offer end users the ability to acquire tools that are compatible with an enterprise operating system platform. Software developers may use the virtual marketplace for distributed tools to reach out to end users in order to distribute tools. On the other hand, the virtual marketplace for distributed tools may provide the end users with a convenient virtual store to connect with developers and purchase desirable tools. The operator of the virtual marketplace for distributed tools may perform validation tests to ensure the tools function with specific guidelines. In return for providing a medium that facilitates transactions between the software developers and the end users, the operator may generate revenue by charging a transaction fee for each performance tool acquisition. The techniques described herein may be implemented in a number of ways. Example implementations are provided below with reference to the following FIGS. 1-6.

Illustrative Architecture

FIG. 1 is a schematic diagram of an illustrative architecture 100 for implementing various embodiments of a virtual marketplace 102 for distributed tools. The virtual marketplace 102 may execute on one or more computing devices 104. The computing devices 104 may include general purpose computers, such as desktop computers, tablet computers, laptop computers, servers, or other electronic devices that are capable of receive inputs, process the inputs, and generate output data. In still other embodiments, the computing devices 104 may be virtual computing devices in the form of computing nodes, such as virtual machines and software containers. The computing devices 104 may be controlled by an operator of the virtual marketplace 102. The virtual marketplace 102 may be a virtual store where software developers may submit tools for distribution, and end user may acquire the tools by providing monetary payment or other compensation to the software developers.

The computing devices 104 may further host developer sandboxes 106(1)-106(N) that is controlled by the operator of the virtual marketplace 102. Each developer sandbox is a software code development environment that isolates new software code from a production environment. A developer sandbox may be specific to a particular type of entity. For example, a developer sandbox for an entity that is a wireless communication carrier may be different from a developer sandbox for an entity that is water utility service provider. In one illustrative scenario, software developers 108(1)-108(N) may interact with the developer sandboxes 106(1)-106(N) to develop tools 110(1)-110(N). The software developers 108(1)-108(N) may use software development tools on the user devices 112(1)-112(N) to access the developer sandboxes 106(1)-106(N) via a network 114. The network 114 may be a local area network (LAN), a larger network such as a wide area network (WAN), or a collection of networks, such as the Internet. Accordingly, the developer sandboxes 106(1)-106(N) may be used by the software developers 108(1)-108(N) to generate and test the software code for the tools 110(1)-110(2). Once a software developer is satisfied with the performance of a tool, the software developer may submit the tool to the virtual marketplace 102.

The operator the virtual marketplace 102 may use a test environment to validate a submitted tool, such as the tool 110(1). In various embodiments, the test environment may include test data in the form of raw events and complex events that are to be processed by the tool. Accordingly, the tool may be deemed to be validated when the tool generates test result that are in line with expected results or within acceptable thresholds. Subsequently, the tool 110(1) may be released, i.e., made available for distribution via the virtual marketplace 102.

As further shown in the architecture 100, an end user 116 may use an enterprise operating system platform 118(1) to collect performance data from an entity 120. The enterprise operating system platform 118(1) may be a copy of a proprietary enterprise operating system platform that is developed by the operator of the virtual marketplace 102. The enterprise operating system platform 118(1) may have been previously distributed by the operator to the end user 116 for use. The enterprise operating system platform 118(1) may execute on one or more computing devices, such as the computing device 122. The one or more computing devices 122 may include general purpose computers, such as desktop computers, tablet computers, laptop computers, servers, or other electronic devices that are capable of receive inputs, process the inputs, and generate output data. In still other embodiments, the computing devices 104 may be virtual computing devices in the form of computing nodes, such as virtual machines and software containers.

In various embodiments, the enterprise operating system platform 118(1) may use software agents to collect performance data from various devices, components, nodes, and/or services of the entity 120. The collected data are then processed by one or more tools, such as the tool 124. The one or more tools may execute in an operating system environment provided by the enterprise operating system platform 118(1). In some embodiments, the one or more tools may have been implemented (e.g., installed, distributed, processed, etc.) on the one or more computing devices 122 in conjunction with the enterprise operating system platform 118(1). In other embodiments, the one or more tools may have been downloaded to the computing devices 122 via the network 114 and implemented on the enterprise operating system platform 118(1). Each of the tools may perform various functions, such as functions that are related to evaluating the performance of the entity 120. However, in other instances, the tools may distribute or manage other services and data for enterprise environments.

The tools may include data reformatting tools, data conversion tools, data aggregation tools, data correlation tools, KPI generation tools, data visualization tools, data adaptor tools, alert tools, automation tools, and/or so forth. A data reformatting tool may reformat the data format of the data that is collected by an enterprise operating system platform for processing by another tool. A data conversion tool may convert values that are collected by an enterprise operating system platform from one measurement standard to another measurement standard. The data aggregation tool may aggregate the data collected by an enterprise operating system platform into different datasets according to grouping parameters. The grouping parameters may include specific time periods (e.g., hourly, daily, etc.), entity nodes, entity components, user device vendor, user device models, and/or so forth. In other embodiments, the grouping parameters may be used to aggregate the data into multiple datasets that correspond to different levels of an entity hierarchy. For example, the data may be aggregated into datasets that correspond to a device level, a service area level, and a geographical market level. The KPI generation tools may include tools that generate KPIs based on data from one or more data sources, but also tools that generate comprehensive KPIs based on analysis of multiple KPIs, or KPIs with data from other data sources. The data visualization tool may be used to view KPIs and data reports in multiple ways, such as via the use of charts, graphs, maps, timelines, and/or so forth.

The data adaptor tools may enable an enterprise operating system platform to access additional data sources that are otherwise unavailable to the enterprise operating system platform, such as data from third-party social media sources, third-party network data, and/or so forth. In some instances, the data adaptor tools may include data-agnostic adapters that are able to retrieve data from the structured databases without regard to the specific content of the data in each of the structured databases. In other embodiments, the data adaptor tools may include data adaptors for other data sources, various vendors, multiple software versions, etc., in which each data adaptor may convert data from one format to another format. The alert tools may include applications that analyze KPI trends and/or other data reports to detect anomalous performance patterns in an entity. For example, an alert tool may consider a KPI trend to be anomalous when there is an increase or decrease in the trend over a designated time period that exceeds a predetermined change threshold. In another example, an alert tool may consider a KPI trend anomalous when the KPI trend indicates that a change in a KPI over time does not fit within a pattern of changes experienced by other associated KPIs, i.e., the change in KPI deviates from the other pattern of changes by a predetermined threshold. The automation tools may automate the performance of one or more functions in response to the detection of specific conditions or variables. For example, an automation tool may automatically throttle or shut down the functions of devices or components of an entity, trigger a maintenance or repair function of the entity, etc., in response to the detection of an anomalous KPI trend. In another example, an automation tool may automatically implement a configuration modification generated by another tool to improve the operations of a device or an entity component. In various embodiments, a tool may incorporate a new data model into an enterprise operating system platform, such as the platform 118(1).

In various embodiments, the tools 110(1)-110(2) may be developed to interact with each other as interrelated tools. Accordingly, the virtual marketplace 102 may store state information regarding the one or more tools that are already being used in conjunction with the enterprise operating system platform 118(1). Additionally, the virtual marketplace 102 may further store the status data of tools (e.g., tools 110(1)-110(N)) that are available for acquisition through the marketplace. For example, the status data of each tool may indicate whether the tool is a new tool, a new version of an existing tool, or whether the tool is available or withdrawn from the marketplace. The status data of the tool may further indicate the tool functionalities and/or input data provided by other tools that the tool is dependent on to carry out its processing functions. Alternatively or concurrently, the status data of the tool may indicate the output data and functionalities that the tool is able to generate. In this way, when the end user 116 of the enterprise operating system platform 118(1) accesses the virtual marketplace 102, the marketplace may present an interactive interface that shows one or more related tools that have input or output dependency relationships with the tools (e.g., tool 124) that are already in use with the platform 118(1). For example, an input dependency means that a related tool available through the marketplace 102 is able to provide functionalities or data to the tool 124, and an output dependency relationship means that a related tool available through the marketplace 102 is able to use the functionalities or data that are provided by the tool 124. Accordingly, in some instance, a new tool implemented on the platform 118(1) that has an output dependency on another particular tool may not function if the particular tool is not implemented on the platform 118(1), this is because functionalities and data provided by the particular tool that the new tool depends on would not be available. In some embodiments, the interactive interface may be presented for display by the enterprise operating system platform 118(1). In other embodiments, the interactive interface may be an application interface or a web interface portal that is accessible to the end user 116 via a client application or a web browser.

Thus, assuming that the end user 116 finds a desired tool 126 that has an input or output dependency relationship with the tool 124, the end user 116 may acquire the related tool 126. In various embodiments, the acquisition may be accomplished via a direct payment at a set price, an auction bid, a reverse auction bid, etc., via the interactive interface. Once the acquisition transaction is complete, the end user 116 may download the related tool 126 for use on the platform 118(1).

Likewise, the end user 128 may be using an enterprise operating system platform 118(N) executing on the computing device 130 to collect performance data from an entity 132. Once again, the enterprise operating system platform 118(N) may be a copy of a proprietary enterprise operating system platform that is developed by the operator of the virtual marketplace 102. The enterprise operating system platform 118(N) may have been distributed by the operator to the end user 128 for use by the user. In such an example, the end user 128 may be executing one or more tools, such as the tool 134, to analyze the performance of the entity 132. Accordingly, the virtual marketplace 102 may recommend additional tools (e.g., tool 136) that have dependency relationships with the one or more tools that are already implemented on the enterprise operating system platform 118(n), or vice versa. The functionalities may provide application program interfaces (APIs) that are called to display data, analyze data, aggregate data, convert data, reformat data, and/or so forth. In other words, the virtual marketplace 102 may recommend tools whose pre-requisites for functionalities and/or data may be satisfied by the already implemented tools. Alternatively or concurrently, the virtual marketplace 102 may recommend tools that are able to provide the pre-requisite data and functionalities to the already implemented tools. Thus, if the end user 128 finds the additional tool 136 to be desirable, the end user 116 may download the tool 126 for implementation on the platform 118(N).

Example Computing Device Components

Figure 2:
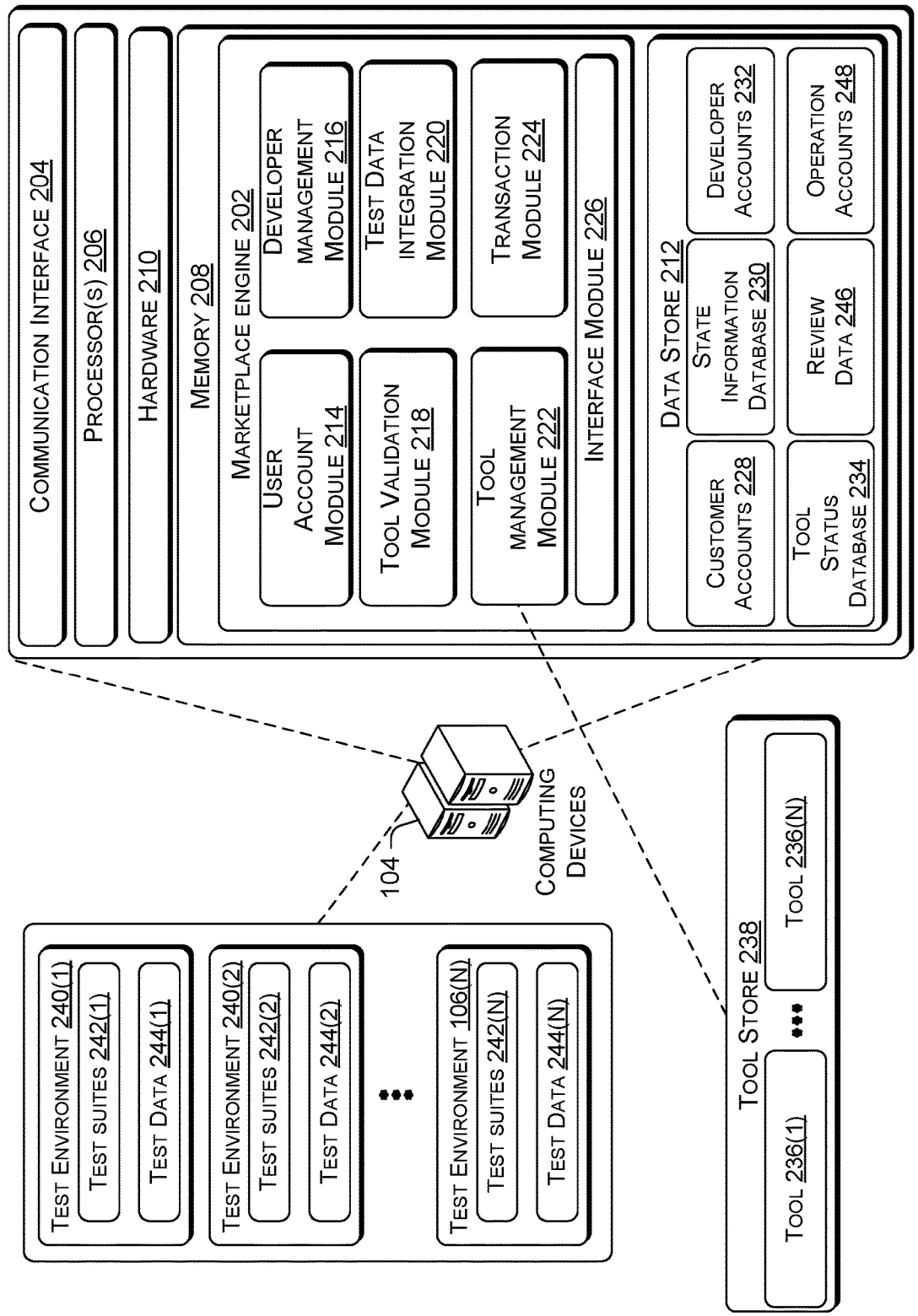
FIG. 2 is a schematic diagram of illustrative components in an example virtual marketplace for distributed tools that distributes tools.

FIG. 2 is a schematic diagram of illustrative components in an example virtual marketplace 102 that distributes tools, such as tools for monitoring the performance of entities. The virtual marketplace 102 may be implemented by a marketplace engine 202 that is hosted by the computing devices 104. The computing devices 104 may include a communication interface 204, one or more processors 206, and memory 208. The communication interface 204 may include wireless and/or wired communication components that enable the one or more computing devices 104 to transmit data to and receive data from other networked devices. The computing devices 104 may be accessed via hardware 210.

The hardware 210 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 208 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The memory 208 may store the marketplace engine 202 and a data store 212. The marketplace engine 202 may include a user account module 214, a developer management module 216, a tool validation module 218, a test data integration module 220, a tool management module 222, a transaction module 224, and an interface module 226. The modules may include routines, program instructions, objects, and/or data structures that perform particular tasks or implement particular abstract data types.

The user account module 214 may enable end users, such as the end users 116 and 128, to create customer accounts 228. For example, the end user 116 may establish a corresponding customer account by providing registration information to the user account module 214 via a computing device, such as the computing device 122. The registration information may include a customer name, a customer address, customer contact information, a login name, a password, and/or so forth. Each of the customer accounts 228 may also include account access information for one or more financial accounts that a corresponding consumer provided for paying transactions and receiving refunds. The transactions may include the acquisition of tools, in-app add-ons, and/or tool support services from the virtual marketplace 102. In various embodiments, the user account module 214 may provide authentication functions that control access to the customer accounts 228. In the context of the virtual marketplace 102, the acquisition of a tool may refer to the purchasing a perpetual license or a license for term to use a tool.

The user account module 214 may further store the state information regarding the tools that are already implemented for use on an installation of the enterprise operating system platform used by each end user. The state information of the tools may be stored in a state information database 230. For example, the end user 116 is using the enterprise operating system platform 118(1), and the platform may automatically send state information regarding the one or more tools (e.g., tool 124) that are implemented on the enterprise operating system platform 118(1) on a continuous or periodic basis. Alternatively, the user account module 214 may periodically poll the enterprise operating system platforms 118(1) for the state information. Alternatively, the enterprise operating system platform 118(1) may push new information to the user account module 214 when a new tool or a new version of a tool is implemented for use on platform, when a tool is removed from the platform, and/or when the operation state of an implemented tool on the platform is modified in any way. In turn, the user account module 214 may store for the end user 116 the state information regarding the one or more tools. The state information collected and stored for each enterprise operating system platform may include the identification information of each tool implemented on the enterprise operating system platform, implementation history for each tool, the version information of each implemented tool, user log information for each tool, total run time of each tool, crash and error reports provided by each tool, data sources used by each tool, and/or so forth. The user account module 214 may store the state information in the state information database 230 of the data store 212. In additional embodiments, the user account module 214 may include a analysis function that uses the state information to generate reports on tools implemented on a particular operating system platform, reports on the categories of tools that are implemented on the platform, statistics on the overlaps in the functionalities of the tools that are implemented on the platform, statistics on data sources that are used by the implemented tools of the platform, and/or so forth.

The developer management module 216 may be responsible for managing software developer access to the developer sandboxes 106(1)-106(N). In various embodiments, the developer sandboxes 106(1)-106(N) may be hosted on the computing devices 104, third-party servers, and/or on servers that are on the cloud. The developer management module 216 may enable software developers, such as the software developers 108(1)-108(N), to create developer accounts 232. A software developer may establish a corresponding software developer account by providing registration information to the developer account module 216 via a user device. The registration information may include a developer name, a business name, a business address, business contact information, a login name, a password, and/or so forth. A developer account may enable a software developer to access a developer sandbox. For example, a software developer who is interested in developing a tool for a wireless communication entity may access a developer sandbox for wireless communication entities. A developer account may also enable a software developer to receive payments from the operator of the virtual marketplace 102 when a tool developed by the software developer is acquired by an end user. For example, a software developer may tie a financial account to the developer account, in which funds may be transferred in and out of the account. In some instances, the developer account may further enable a software developer to pay a one-time or recurring fee for the use of a developer sandbox. The developer management module 216 may further track developer access to the developer sandboxes 106(1)-106(N). The information may include a log of developer access to the developer sandboxes, amount of computing resources used by each software developers in different time frames, information the identity of tools and tool versions that are developed, and/or so forth. Once a software developer has developed a tool, the software developer may use a user device to inform the developer management module 216 that the tool is submitted for validation. In various embodiments, the developer management module 216 may provide authentication functions that control access to the developer accounts 232.

The tool validation module 218 may be responsible for validating tools that are submitted before they are placed for distribution via the virtual marketplace 102. In various embodiments, a tool may be validated using a test environment that includes a host of test suites and test data. Each of the test environment may be tailored for a specific type of entity (e.g., wireless communication carrier), and designed to simulate a production environment for performing data or service distribution and management functions, such as evaluating the performance of an entity. Each set of test data may be tailored according to a version of the tool tested, a production environment of the tool, a software developer that developed the tool to be tested, and/or so forth. The test suites and test data of a test environment are designed to validate that the tool is able to perform properly under a host of simulated conditions. For example, the computing devices 104 may host test environments 240(1)-240(N). In turn, the test environments 240(1)-240(N) may respectively include test suites 242(1)-242(N) and test data 244(1)-244(N).

The test data may include raw events and complex events that are to be processed by a tool. The raw events may be simple events, while complex events are the calculations or aggregations of other events. Raw events are typically events reported directly by sensors in a system. Complex events are typically calculations using data from raw events and/or other complex events as input values. For example, a raw event may be an increase in an output of a water distribution conduit of a water utility at a specific time, while a complex event may be an increase in the output of the water distribution conduit that coincides with decrease outputs in the adjacent water distribution conduits at the specific time. Accordingly, the tool may be deemed to be validated when the tool generates test results that meet one or more criteria.

The criteria may include the test results being in line with expected values or within predetermined acceptable value thresholds. In at least some embodiments, the test results generated by the tools being tested may include complex data. In one scenario, the test result for a tool may be considered in line with expected results when each value in the test result is within a predetermine range of a corresponding value generated by a benchmark tool. In such a scenario, the benchmark tool may be a previous version of the tool or a tool that is developed by the operator of the virtual marketplace 102. The criteria may further include the tool generating the correct test results within a predetermined amount of time, the computing resources used by the tool during the test being under a predetermined threshold, the tool being able to recovery from one or more simulated errors with the input data or the computing resource, and/or so forth. Once a tool is validated, the tool validation module 218 may release the tool for distribution. In one scenario, the tool validation module 218 may change the status of the tool from pre-release (e.g., beta version) to certified following validation. Subsequently, the tool validation module 218 may release the certified tool for distribution via the virtual marketplace 102.

The test data integration module 220 may integrate the test result generated by a validated tool into the test data of a corresponding test environment for a specific type of entity. In various embodiments, the test results may include complex data. The additional complex data may include complex events, conditional events, event value pairs, conditional dependencies between parameters and events, aggregated data points, and/or other data that have been generated from the testing of the tool. The additional complex data of the test result may be further used to validate other tools in the test environment. In this way, the test environment may be constantly supplied with additional test data that is otherwise unavailable or difficult to simulate. However, the test data integration module 220 may discard test results generated by tools that failed validation.

In additional embodiments, the test data integration module 220 may further integrate preliminary test results of tools that are being tested in production environments into the test data of the corresponding test environments. For example, the end user 116 may be beta testing the tool 124 on the enterprise operating system platform 118(1) to evaluate how effectively the tool 124 is able to assess the performance of the entity 120. The tool 124 may have been originally validated using the test environment 240(1). As a part of the best testing, the tool 124 may include a remote reporting function that provide preliminary test results to the test data integration module 220. The preliminary test results may include complex events, conditional events, event value pairs, conditional dependencies between parameters and events, aggregated data points, and/or other data that have been generated from the preliminary testing of the tool. Accordingly, the test data integration module 220 may integrate the preliminary test results into the test data 244(1) of the test environment 240(1).

The tool management module 222 may store tools 236(1)-236(N) in a tool store 238, in which the tool store 238 may reside on the computing devices 104 or at a remote location. In some instances, a tool may be placed in the tool store 238 by the tool management module 222 when it is a new tool that is validated for distribution via the virtual marketplace. In other instances, the tool management module 222 may replace an existing tool that is stored in the tool store 238 with a tool when the tool is an updated version that is validated. In various embodiments, the tool management module 222 may determine whether a tool that is to be distributed is a new version or an updated version based on the data stored in a tool status database 234. Accordingly, when a tool is ready for distribution, the tool management module 222 may query the tool status database 234 to determine whether the tool is a new tool or a new version of an existing tool. In some instances, the tool management module 222 may also remove a tool from the tool store 238, upon which the status of the removed tool in the tool status database 234 may be updated by the tool management module 222.

Accordingly, the tool management module 222 may update the status data of the tools 236(1)-236(N) in the tool status database 234 in view of tool changes. The tools 236(1)-236(N) may include tools that are available for acquisition through the marketplace, as well as tools that have already been acquired by end users and implemented on various enterprise operating system platforms. For example, the status data of a tool may indicate whether the tool is a new tool, a new version of an existing tool, or whether the tool is available or withdrawn from the marketplace. The status data of the tool may further indicate that pre-requisite types of input data that the tool is designed to process, as well as the pre-requisite tool functionalities of other tools that the tool is dependent on to carry out its processing functions. The status data of the tool may also indicate the output data that are generated by the tool as well as the functionalities that are provided by the tool. In some instances, the status data of tool may further include details such as obsolesce date for the current version of the tool, planned end of support date for the current version, or associated software developer operation status (e.g., whether the software developer is in business).

In this way, when an end user accesses the virtual marketplace 102 with a customer account, the tool management module 222 may provide tool recommendations to the end user. In various embodiments, the tool management module 222 may determine the input and output functionalities and data of the tools that are already in use by the end user at an enterprise operating system platform. The tool management module 222 may further compare such information to the input and output functionalities and data of tools 236(1)-236(N). Accordingly, the tool management module 222 may determine one or more related tools of the tools 236(1)-236(N) that are able to use the functionalities and output data of the tools that are already in use at the enterprise operating system platform. Alternatively or concurrently, the tool management module 222 may also ascertain one or more related tool of the tools 236(1)-236(N) that are able to provide input data and functionalities to the tools that are already in use at the enterprise operating system platform. In other words, the tool management module 222 may ascertain related tools that have input and/or output dependencies to the tools that are already in use by the end user at a corresponding enterprise operating system platform. The one or more related tools may presented by the tool management module 222 via an interactive interface. The interactive interface may also present the price, acquisition method, and/or the acquisition conditions under which the end user may acquire each of the related tools.

In additional embodiments, the tool management module 222 may also present, via an interactive interface, a predetermined list of tools, regardless of whether such tool have input or output dependencies with the tools that are already in use on a corresponding enterprise operating system platform. Accordingly, in one scenario, the tools in the predetermined list may have no dependencies to the tools that are already in use at the corresponding enterprise operating system platform. Such a predetermined list of tool may be tools that are most popular in the virtual marketplace 102, tools that are most recently added to the marketplace 102, tools that have the highest user ratings in the marketplace 102, and/or so forth. The tools shown in the predetermined list may be accompanied by information such as input and output data and functionality pre-requisites, user ratings, price details, payment details, and/or so forth.

In other embodiments, the tool management module 222 may also present, via an interactive interface to an end user, notifications regarding the availability of new versions of tools that are already implemented on a corresponding enterprise operating system platform. In various instances, the notification for a new version may include details such as new features, deleted features, bug fixes, improvements, upgrade fee, new support policy, and/or so forth. However, such a notification will not compel an end user to upgrade if the end user has no desire to do so. The tool management module 222 may also on occasion present relevant notifications regarding a current version of a tool that is in use by an end user on a corresponding enterprise operating system platform. A relevant notification may include details such as obsolesce date for the current version, end of support date for the current version, or associated software developer operation status (e.g., whether the software developer is in business). The relevant notification for a current version of a tool may be independently presented via an interactive interface even when no updated version of the tool is available. In some embodiments, each tool that is presented via an interactive interface may be accompanied by a user reviews and ratings. The user reviews for a tool may be submitted by end users via interactive review interfaces, such that the users may leave comments with respect to the pros and cons of the tool. The user ratings for a tool may be on a numerical scale. For example, the numerical scale may be a star rating scale (e.g., four out of five stars), a points system (e.g., 90 out of 100 points), a recommendation percentage scale (e.g., recommended by 80% of the end users), etc. A rating interactive interface for a tool may enable an end user to rate the tool as a whole and/or rate individual features of the tool.

The transaction module 224 may process the acquisition of tools from the virtual marketplace 102. When an end user is ready to acquire a recommended tool, the end user may initiate an acquisition of the tool via the interactive interface. In various embodiments, the tool may be acquired via a direct payment at a set price, an auction, a reverse auction, and/or other acquisition arrangements. In response, the transaction module 224 may initiate an acquisition process. For example, in the case of a purchase at a set price, the transaction module 224 may obtain payment for the purchase of a tool from a financial account of an end user. A financial account may be a checking account, a savings account, a debit card account, a credit card account, a charge card account, a gift card account, and/or the like.

Alternatively, the purchase price may also be partially or completed paid via points or credits that the end user has stored with the virtual marketplace 102. In some instances, the acquisition price for a tool may be set according to market conditions. For example, the acquisition price may be set lower for an initial number of tool acquisitions. However, the acquisition price may be set incrementally higher for one or more subsequent acquisitions. In another example, the acquisition price may be initiated set at a specific value which is then incrementally decreased over time as additional units are sold. Alternatively, the initial acquisition price may be incrementally decreased as sales quota are not met within predetermined time periods. In further examples, the acquisition price for a tool may be discounted or reduced to zero for end users who agree to become beta testers of the tool.

In other scenarios in which the acquisition is performed through an auction or a reverse auction, the end user may initiate a bidding process with the transaction module 224 via an interactive interface. In turn, the transaction module 224 may perform the virtual auction that involves multiple electronic bidders to determine which of the multiple bidders has the winning bid. Subsequently, the transaction module 224 may inform the winning end user via an interactive interface. As such, payment for the purchase of the tool is then obtained by the transaction module 224 from a financial account of the end user. Once payment is fulfilled, the transaction module 224 may initiate a distribution of the tool to the end user. In some instances, the transaction module 224 may provide a link to a server location from which the tool may be downloaded. For example, the link may be a web link, a link to a secure file transfer protocol (FTP) server, or a link to a secure file sharing site from which the tool may be downloaded.

However, in an alternative scenario, an end user may decide that no current tool offer meets the specific needs of the end user. Accordingly, the transaction module 224 may provide interactive interfaces for performing proposal-based bidding. In proposal-based bidding, the transaction module 224 may provide an interactive interface that enables an end user to create a request for a tool. The request may specify the functionalities of the tool, input and output data of the tool, and a desired price for the tool. In turn, the transaction module 224 may electronically present the tool request to multiple developers. For example, the transaction module 224 may post the tool request on a web page, send the tool request via email to developers, or generate another form of electronic communication that is distributed to developers. Furthermore, the transaction module 224 may provide an interactive interface for developers to submit developer bids that indicate acceptance of the tool request and a delivery time for the tool. Subsequently, the transaction module 224 may send an electronic notification to the end user so that the end user may review the one or more developer bids via an interactive interface provided by the transaction module 224. Following review of the developer bids, the end use may accept one or more of the developer bids. Once the end user has accepted a developer bid of a developer, the customer is obligated to test a tool provided by the developer under the tool request if the tool is delivered to the customer within the specified delivery time.

Upon submission of the tools to the virtual marketplace 102 by the developers, the transaction module 224 may grant the end user evaluation access to the submitted tools. Following evaluation, the end user may send a notification to the transaction module 224 indicating an acceptance of one tool. The transaction module 224 may then arrange for the end user and the developer of the accepted tool to close the transaction for the tool based on the desired price. In some instances, the transaction module 224 may mandate that the end user provide reasons as why the end user did not accept the other tools that were developed prior to arranging for the close of the transaction. Subsequently, the transaction module 224 may provide interactive review interfaces for end users to rate developers and vice versa. For example, end users may rate developers on areas such as delivery speed, quality of the delivered tool, promptness and reliability of communication, and/or so forth. In turn, the developers may rate the end users on areas such as promptness and reliability of communication, reasonableness of the tool requests, reasonableness of follow up requests, and/or so forth. The ratings provided to the transaction module 224 may be on a numerical scale. For example, the numerical scale may be a star rating scale (e.g., four out of five stars), a points system (e.g., 90 out of 100 points), a recommendation percentage scale (e.g., recommended by 80% of the end users), etc. The transaction module 224 may display the ratings of the end users and/or developers on the interactive interfaces that are used for the proposal-based bidding.

In some instances, a payment for a tool may be fulfilled through an installment payment plan. In such instances, the tool may be initially implemented on an enterprise operating system platform upon a first payment. Subsequently, the tool may periodically send a status check request message to the transaction module 224 to ascertain whether the tool is to continue to execute on the enterprise operating system platform. Accordingly, if the transaction module 224 determines that an additional payment has been received from the end user in accordance with the installment payment plan, the transaction module 224 may send a continue operation reply message to the tool. Upon receiving the rely message, the tool may continue to operate. Otherwise, the transaction module 224 may send an operation termination reply message to the tool to cause the tool to cease operation.

The transaction module 224 may further disburse the fee collected from an end user who acquired a tool to a financial account of the software developer who developed the tool. The disbursement may be implemented by the transaction module 224 according to prearranged terms between the operator and the software developer. In some instance, the prearranged terms may allow the operator of the virtual marketplace 102 to retain a predetermined percentage of the fee remitted to the software developer as compensation. In other instances, the prearranged terms may enable the operator to retain the fees paid for a predetermined number of initial tool sales and disburse the fees for the subsequent sales of the tool to the software developer. In still other instances, the prearranged terms may allow the operator to retain a predetermined percentage of fees remitted for each tool sale after a number of sales have been completed in a time period. Nevertheless, the transaction module 224 may disburse the fees collected to the software developer according to other schemes, provided that the operator receives compensation for at least some of the tool sales performed through the virtual marketplace 102.

Accordingly, the transaction module 224 may prompt a developer select one of multiple charging arrangements when the developer provides a tool for distribution via the virtual marketplace 102. For example, a first charging arrangement may enable an end user to pay a recurring (e.g., monthly) fee for use. However, the developer does not guarantee keeping the tool up-to-date with new versions. In a second example charging arrangement, the end user may be allowed to purchase an enterprise license for a one-time fee. In this charging arrangement, the developer also does not guarantee keeping the tool up-to-date with new versions. In a third example charging arrangement, the end user may be allowed to purchase an enterprise license with yearly support for a yearly maintenance fee. In such an arrangement, the developer will contract with the end user to keep the tool update-to-date with new versions. In order to facilitate the disbursement and collection of fees, the transaction module 224 may use one or more operation accounts 248 that are established for such a purpose.

The interface module 226 may generate various interactive interfaces for the other modules of the marketplace engine 202. In some embodiments, the interface modules 226 may coordinate with an enterprise operating system platform to present an interactive interface and receive user input that are inputted by an end user using the interactive interface. In other embodiments, the interactive interface that is generated by the interface module 226 may be an application interface or a web interface portal that is accessible to the end user 116 via a client tool or a web browser. In various embodiments, each of the interactive interfaces may be constructed using HTML objects, script objects, Cascade Style Sheet (CSS) objects, image objects, and/or other static and/or dynamic objects.

The data store 212 may store the data that is received and processed by the various modules of the marketplace engine 202. The data store 212 may include one or more databases, such as relational databases, object databases, object-relational databases, and/or key-value databases. The data stored in the data store 212 may include the customer accounts 228, the state information database 230, the developer accounts 232, the tool status database 234, the review data 246, and the operation accounts 248.

Illustrative User Interface

Figure 3:
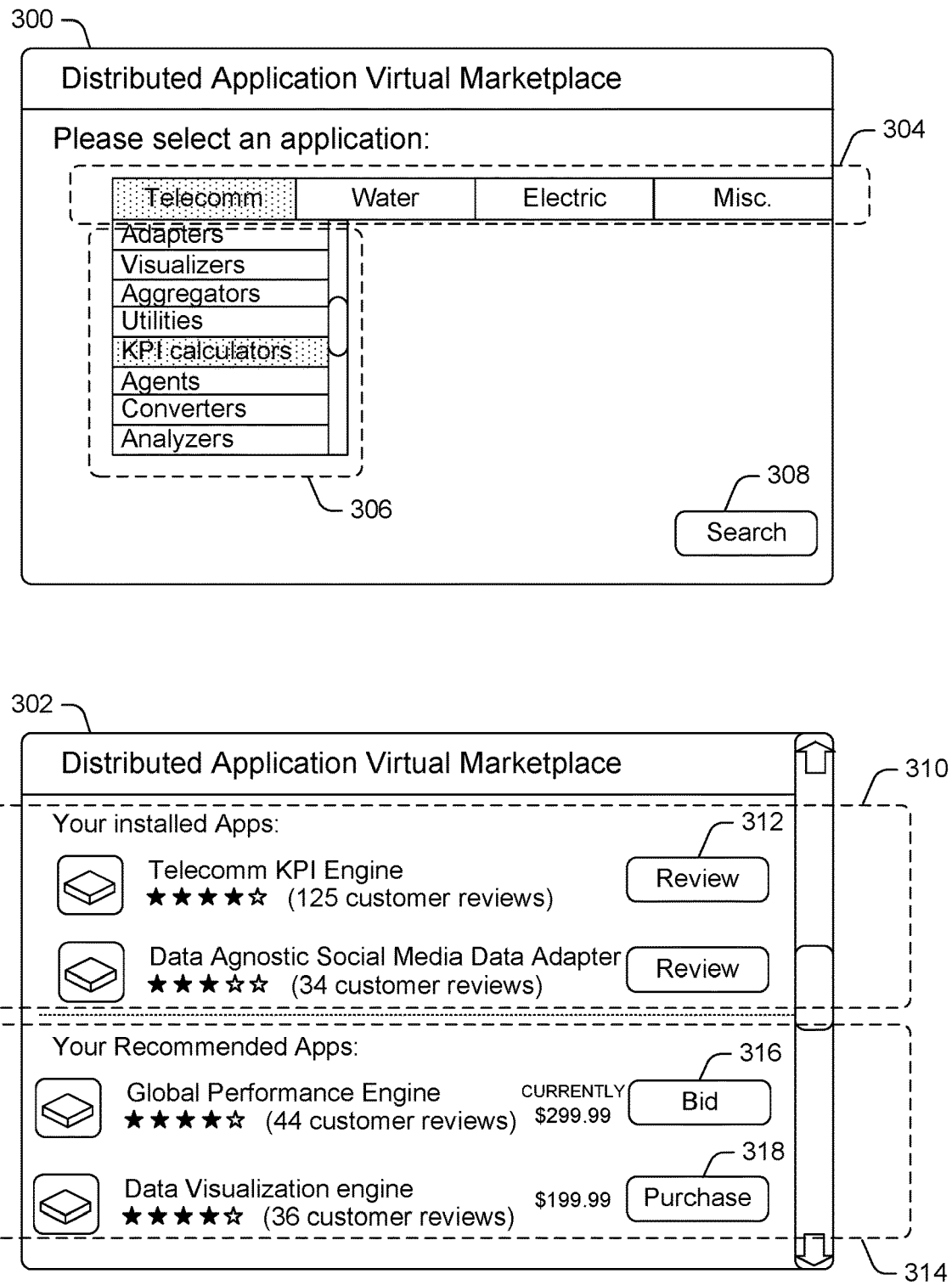
FIG. 3 is an illustrative interactive interfaces of the virtual marketplace for distributed tools for selecting tools.

FIG. 3 is an illustrative interactive interfaces of the virtual marketplace for selecting tools. The interactive interfaces may be displayed by the interface module 226 of the marketplace engine 202. The interactive interfaces may enable an end user to view tools that are available from the virtual marketplace 102, as well as acquire tools through the marketplace 102. The illustrative interactive interfaces may include an interactive interface 302 that shows available tools by categories, and an interactive interface 302 that shows tools that are recommended by the marketplace engine 202.

The interactive interface 300 may enable an end user to browse tools that are available through the management tool marketplace 102. The interactive interface 300 may include a category selection menu 304. The category selection menu 304 may enable an end user to browse through multiple categories of tools. In at least one embodiment, the categories may correspond to the different types of entities for which tools are available. Once the end user has selected a category of tool, the interactive interface 300 may provide a drop down menu, such as the drop down menu (e.g., drop down menu 306), that shows the multiple subcategories of tools are available within the category. In various embodiments, the multiple subcategories may correspond to the component types of tools that perform different performance evaluation functions. Accordingly, once the end user has selected a category and a subcategory, the end user may activate a search option 308 to display the tools that are in the subcategory. The tools in each subcategory may be displayed by an interactive interface according to sorting or filtering criteria. For example, the tools may be sorted according to locations where the tools may be deployed (e.g., zip codes, municipalities, states, or regions). In another example, the tools may be filtered according to report bugs, such that an interactive interface will display tools without reported bugs, or display tool in ascending or descending order based on the number of bugs that are reported for each tool. Further, once a tool is selected, the interactive interface may display information that are relevant to the tool, such as the data inputs and functionalities that the tool depend on, the data outputs and functionalities that the generated by the tool, the APIs and/or data adaptors that provides the data inputs and outputs, and/or so forth. Additionally, other filtering or sorting options may enable the end user to view tools by specific data and/or functionality pre-requisites for input data or output data, by version numbers, by user ratings, and/or so forth.

The interactive interface 302 may display tools that are recommended by the marketplace engine 202 to an end user based on one or more tools that are already implemented on an enterprise operating system platform in use by the end user. The interactive interface 302 may include a section 310 that shows the tools that are already on the enterprise operating system platform. In some embodiments, the section 310 may display a review option (e.g., review option 312) for each tool such that the end user may provide a review and/or a rating of the tool. Further, the current review and/or rating information as provided by other end users may be displayed by the section 310.

The interactive interface 302 may further show the recommended tool in the section 314. For each tool, the current review and/or rating information as provided by other end users may be displayed by the section 314. The section 314 may also show different acquisition options for the tools. For example, a bid option 316 may be shown for a tool that can be acquired through an auction or reverse auction, while a purchase option 318 may be shown for a tool that can be acquired via a direct payment. Other interactive interfaces display the status data of a tool when a change in the status of the tool occurs. In one scenario, status data such as the availability of a new version, the availability of a new recommended tool, the removal of a tool used by the end user on a corresponding enterprise operating system platform from the virtual marketplace 102 may be provided via an interactive interface when the end user accesses the marketplace 102.

Illustrative Operations

Figure 4:
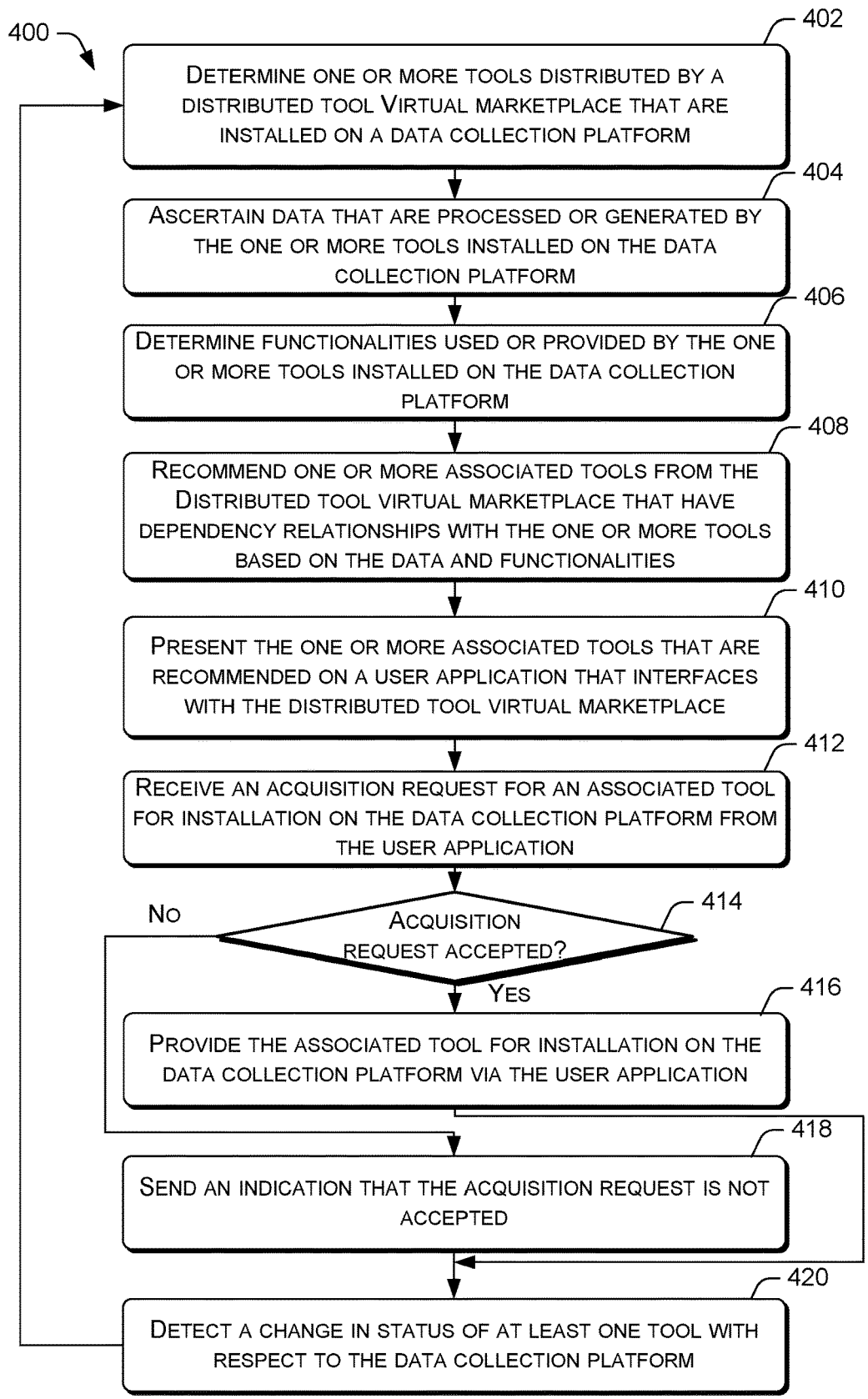
FIG. 4 is a flow diagram of an illustrative process for tailoring the display of tools based on tools that are currently implemented on an enterprise operating system platform in use by an end user.
Figure 5:
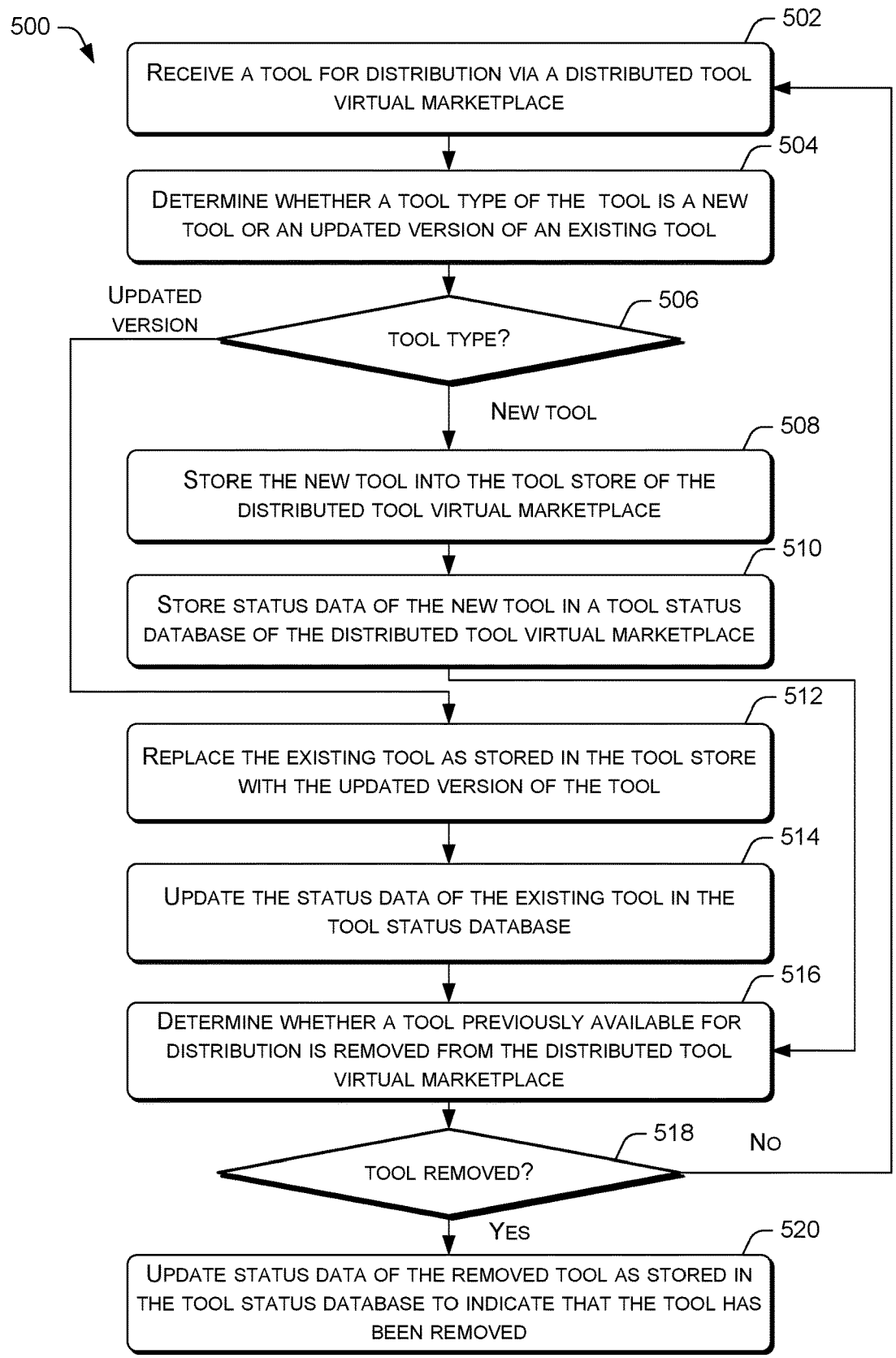
FIG. 5 is a flow diagram of an illustrative process for updating the virtual marketplace for distributed tools with status data of a tool that is distributed via the virtual marketplace.
Figure 6:
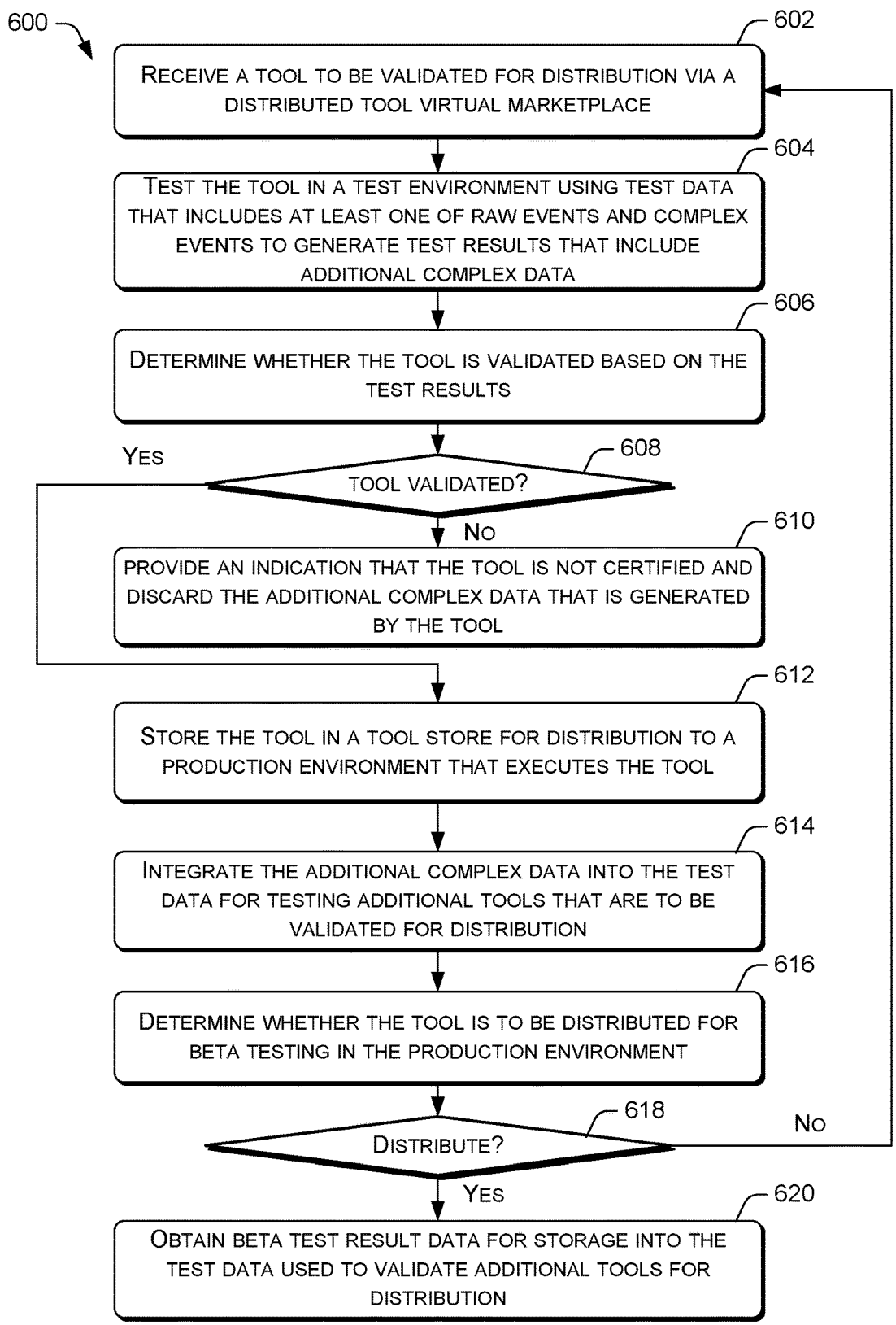
FIG. 6 is a flow diagram of an illustrative process for testing and validating a tool for distribution via the virtual marketplace for distributed tools.

FIGS. 4-6 show illustrative processes 400-600 that implement a virtual marketplace 102. Each of the processes 400-600 is illustrated as a collection of blocks in a logical flow diagram, which represents a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 400-600 are described with reference to the architecture 100 of FIG. 1.

FIG. 4 is a flow diagram of an illustrative process 400 for selectively presenting tools that are available for distribution to an end user by the virtual marketplace for distributed tools. At block 402, the marketplace engine 202 may determine store status information indicating one or more tools that are implemented on an enterprise operating system platform, such as the enterprise operating system platform 118(1). The enterprise operating system platform may be distributed by the operator of the virtual marketplace 102. In various embodiments, the marketplace engine 202 may make such a determination based on the state information stored in the state information database 230. The state information may further include the identification information of each implemented tool, implementation history for each tool, the version information of each implemented tool, user log information for each tool, total run time of each tool, crash and error reports provided by each tool, and/or so forth. In one scenario, the one or more tools may be tools that are used to determine the performance of an entity.

At block 404, the marketplace engine 202 may ascertain data that are processed or generated by each tool that is implemented on the enterprise operating system platform. The data that is processed or generated by each tool may include KPIs, other performance indicators, data reports, aggregated data sets, reformatted data, collected data, and/or so forth. The marketplace engine 202 may make such a determination based on the tool status database 234 that is stored in the data store 212.

At block 406, the marketplace engine 202 may determine functionalities that are used or provided by the one or more tools that are implemented on the enterprise operating system platform. The functionalities may include data reformatting, data conversion, data aggregation, data correlation, key performance indicator (KPI) generation, and/or so forth. Once again, the marketplace engine 202 may make such a determination based on the tool status database 234 that is stored in the data store 212.

At block 408, the marketplace engine 202 may recommend one or more associated tools from the virtual marketplace 102 that have dependency relationships with the one or more tools that are implemented on the enterprise operating system platform based on the data and functionalities. In various embodiments, an input dependency relationship is a relationship in which an associated tool available through the marketplace is able to provide functionalities or data to a tool implemented on the enterprise operating system platform. On the other hand, an output dependency relationship is a relationship in which an associated tool available through the marketplace 102 is able to use the functionalities or data that are provided by the tool implemented on the enterprise operating system platform.

At block 410, the marketplace engine 202 may present the one or more recommended tool an end user. In various embodiments, the marketplace engine 202 may make the presentation via an interactive interface that is displayed on a computing device. For example, the marketplace engine 202 may use an interactive interface on the computing device 122 to present the additional tool 126 to the end user 116.

At block 412, the marketplace engine 202 may receive an acquisition request for an associated tool that is recommended by the marketplace engine 202. The acquisition request may be initiated by the end user (e.g., end user 116) at an interactive tool on a computing device (e.g., computing device 122). In various embodiment, the acquisition request may be a request to acquire the tool through a payment, to bid on the tool via an auction, or to acquire the tool through some other form of exchange of value.

At decision block 414, the marketplace engine 202 may determine whether the acquisition request is acceptable. The acquisition request may be accepted if the request satisfies one or more acceptance criteria for acquisition, such as paying or promising to pay a purchase price directly or via an installment plan, winning an auction, etc. Accordingly, if the marketplace engine 202 determines that the acquisition request is acceptable ("yes" at decision block 414), the process 400 may proceed to block 416.

At block 416, the marketplace engine 202 may provide the associated tool for implementation on the enterprise operating system platform. In various embodiments, the marketplace engine 202 may send the tool to the enterprise operating system platform via the network 114. For example, the marketplace engine 202 may deliver the tool 126 to the enterprise operating system platform 118(1) via the network 114. However, if the marketplace engine 202 determines that the acquisition request is not acceptable ("no" at decision block 414), the process 400 may proceed to block 418. At block 418, the marketplace engine 202 may send a notification to an interactive interface of the end user (e.g., end user 116) indicating that the acquisition request is not accepted. For example, the interactive interface may be displayed on the computing device 122 of the end user 116.

At block 420, the marketplace engine 202 may detect a status change in at least one tool with respect to the enterprise operating system platform. In various embodiments, the status change of a tool may be the implementation of a tool, the removal of the tool, the replacement of the tool with a new version, and/or so forth. Accordingly, the process 400 may loop back to block 402, such that the marketplace engine 202 may store status information regarding the at least one tool.

FIG. 5 is a flow diagram of an illustrative process 500 for updating the virtual marketplace for distributed tools with status data of a tool that is distributed via the marketplace. At block 502, the marketplace engine 202 may receive a tool for distribution via a virtual marketplace 102. In various embodiments, the tool may be developed by a software developer using a developer sandbox that is provided by the operator of the virtual marketplace 102. The tool may be further validated by the operator for release via the virtual marketplace 102.

At block 504, the marketplace engine 202 may determine whether a tool type of the tool is a new tool or an updated version of an existing tool. In various embodiments, the marketplace engine 202 may perform such determine by searching the tool status database 234 whether a version of the tool exist, and if so, whether the existing version of the tool matches the current version of the tool. Accordingly, at decision block 506, if the marketplace engine 202 determines that the tool is a new tool, the process 500 may proceed to block 508. At block 508, the marketplace engine 202 may store the new tool into the tool store 238 of the virtual marketplace 102. At block 510, the marketplace engine 202 may store the status data of the new tool in the tool status database 234 of the virtual marketplace 102. The status data for the tool may include the identification information of the tool, time and date that the tool is stored for distribution, the version number of the tool, the identification information of the originating software developer, a status of the software developer, and/or so forth. The status data may further indicate the input data and functionalities that are the pre-requisites of the tool, as well as the output data and functionalities provided by the tool. Subsequently, the process 500 may proceed directly to block 516.

Returning to decision block 506, if the marketplace engine 202 determines that the tool is an updated version of an existing tool, the process 500 may proceed to block 512. At block 512, the marketplace engine 202 may replace the existing tool as stored in the tool store 238 with the updated version of the tool. At block 514, the marketplace engine 202 may update the status data of the existing tool in the tool status database 234. In various embodiments, the status data may be updated to indicate a new version number, any new input data and functionalities that are the pre-requisites of the tool, as well as any new output data and functionalities provided by the tool, and/or so forth.

At block 516, the marketplace engine 202 may determine whether a tool previously available for distribution is removed from the virtual marketplace 102. In various embodiments, the tool may be removed by the software developer or the operator of the marketplace 102 for various reasons, such as obsolesce of the tool, discovery of previously missed bugs or errors in the tool, violation of distribution agreement between the operator and the software developer, and/or so forth.

Accordingly, at decision block 518, if the marketplace engine 202 determines that the tool is removed ("yes" at decision block 518), the process 500 may proceed to block 520. At block 520, the marketplace engine 202 may update the status data of the removed tool as stored in the tool status database 234 to indicate that the tool has been removed. However, if the marketplace engine 202 determines that the tool is not removed ("no" at decision block 518), the process 500 may loop back to block 502.

FIG. 6 is a flow diagram of an illustrative process 600 for testing and validating a tool for distribution via the virtual marketplace for distributed tools. At block 602, the marketplace engine 202 may receive a tool to be validated for distribution via the virtual marketplace 102. The tool may be developed by a software developer using a developer sandbox that is provided by the operator of the marketplace 102. At block 604, the marketplace engine 202 may test the tool in a test environment using test data that includes at least one of raw events and complex events. The testing may be performed using a testing environment (e.g., test environment 240(1)) that is specifically tailored to an entity type of the entity for which the tool is determined as being designed to function. The testing of the tool may generate test results that include additional complex data. In various embodiments, the additional complex data may include complex events, conditional events, event value pairs, conditional dependencies between parameters and events, aggregated data points, and/or other data that have been generated from the testing of the tool.

At block 606, the marketplace engine 202 may determine whether the tool is validated based on the test results. In various embodiments, the tool may be deemed to be validated when the tool generates test results that meet one or more criteria. The criteria may include the test results being in line with expected values or within predetermined acceptable value thresholds. The criteria may further include the tool generating the correct test results within a predetermined amount of time, the computing resources used by the tool during the test being under a predetermined threshold, the tool being able to recover from one or more simulated errors with the data or the computing resource, and/or so forth.

Accordingly, if the tool is not validated based on the test results ("no" at decision block 608), the process 600 may proceed to block 610. At block 610, the marketplace engine 202 may provide an indication that the tool is not certified. For example, the indication may be displayed via to an end user an interactive user interface on a computing device. Subsequently, the marketplace engine 202 may discard the additional complex data that is generated by the tool. However, if the tool is validated based on the test results ("yes" at decision block 608), the process 600 may proceed to block 612. At block 612, the marketplace engine 202 may deem the tool as certified for distribution. Accordingly, the marketplace engine 202 may store the tool in the tool store 238 of the virtual marketplace 102, such that the tool may be distributed to a production environment (e.g., the enterprise operating system platform 118(1)) that executes the tool.

At block 614, the marketplace engine 202 may integrate the additional complex data into the test data for testing additional tools that are to be validated for distribution. In various embodiments, the complex data generated from the testing of a tool of a particular type may be used as test data for testing additional tools of the same type. For example, the testing of a telecommunication network performance evaluation tool may generate complex data. In turn, the complex data may be integrated into the original test data to validate other telecommunication network performance evaluation tools that are submitted by software developers.

At block 616, the marketplace engine 202 may determine whether the tool is to be distributed for preliminary testing. Such a determination may be made by the marketplace engine 202 based on a setting implemented by the operator of the virtual marketplace 102. Accordingly, if the marketplace engine 202 determines that the tool is to be distributed ("yes" at decision block 618), the process 600 may proceed to block 620. At block 620, the marketplace engine 202 may obtain the preliminary test result data for storage into the test data to validate additional tools. In various embodiments, the preliminary test result data may include complex events, conditional events, event value pairs, conditional dependencies between parameters and events, aggregated data points, and/or other data that have been generated from the testing of the tool. In various embodiments, the complex data generated from the preliminary testing of a tool of a particular type may be used as test data for testing additional tools of the same type. For example, the preliminary testing of a utility provider performance evaluation tool may generate complex data. In turn, the complex data may be integrated into the original test data to validate other utility provider performance evaluation tools that are submitted by software developers.

In summary, the virtual marketplace for distributed tools may offer end users the ability to acquire tools that are compatible with an enterprise operating system platform. Software developers may use the virtual marketplace to reach out to customers in order to sell tools. On the other hand, the virtual marketplace may provide the end users with a convenient virtual store to connect with developers and purchase desirable tools. The operator of the virtual marketplace may perform validation tests to ensure the tools function with specific guidelines. In return for providing a medium that facilitates transactions between the software developers and the end users, the operator may generate revenue by charging a transaction fee for each performance tool acquisition.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. One or more non-transitory computer-readable media storing computer-executable instructions that upon execution cause one or more processors to provide an interactive user interface for a distributed tool virtual marketplace by performing acts comprising:
   determining, based on state information stored in a state information database and corresponding to an enterprise software platform of an end user, one or more implemented tools currently implemented on the enterprise software platform;
   determining, based on status data stored in a tool status database and corresponding to the one or more implemented tools, one or more dependencies of the one or more implemented tools, each dependency being one of an input dependency and an output dependency, an input dependency corresponding to data or functionality that may be provided to the one or more of the implemented tools, and an output dependency indicating data or functionality that may be provided by the one or more of the implemented tools;
   determining one or more associated tools from the distributed tool virtual marketplace that has at least one dependency relationship with the one or more implemented tools, each dependency relationship being one of an input dependency relationship and an output dependency relationship, an input dependency relationship corresponding to an ability to provide data or functionality corresponding to an input dependency of the one or more implemented tools, and an output dependency relationship corresponding to an ability to use data or functionality corresponding to an output dependency of the one or more implemented tools;
   providing the interactive user interface including providing a menu including the one or more associated tools for display to the user; and
   receiving, from the end user via the menu of the interactive user interface, an acquisition request for an associated tool of the one or more associated tools,
   wherein at least one of the state information database and the tool status database are stored in a computer storage media.

2. The one or more non-transitory computer-readable media of claim 1, wherein providing the interactive user interface further comprises providing the interactive user interface using a user application implemented on a computing device of the end user.

3. The one or more non-transitory computer-readable media of claim 2, wherein determining the one or more associated tools further comprises filtering of the one or more associated tools by at least one of a tool category, a tool subcategory, a tool type, a tool version, a tool deployment location, a reported bug, or a type of dependency relationship.

4. The one or more non-transitory computer-readable media of claim 1, wherein providing the interactive user interface further comprises providing the at least one dependency relationship for display on a user application implemented on a computing device of the end user.

5. The one or more non-transitory computer-readable media of claim 1, wherein providing the interactive user interface further comprises providing for display to the user a list of one or more additional tools that lack any dependency relationship with the one or more implemented tools.

6. The one or more non-transitory computer-readable media of claim 1, wherein the acts further comprise:
   receiving the acquisition request from a user application that is implemented on a computing device of the end user, the acquisition request including a payment, an auction bid, or a reverse auction bid;
   providing the associated tool for implementation on the enterprise software platform in response to determining that the acquisition request fulfills one or more acceptance criteria; and
   sending an indication that the acquisition request for the associated tool is not accepted in response to determining that the acquisition fails to fulfill one or more acceptance criteria.

7. The one or more non-transitory computer-readable media of claim 6, wherein an acceptance criterion includes fulfilling an installment payment plan, wherein the acts further comprise:
   receiving a status check request message from the associated tool following implementation on the enterprise software platform, the status check message requesting to ascertain whether the associated tool is to continue to execute on the enterprise software platform; and
   sending a continue operation reply message to the associated tool in response to determining that an additional payment has been received from the end user in accordance with the installment payment plan.

8. The one or more non-transitory computer-readable media of claim 1, wherein the one or more implemented tools or the associated tool is one of a data reformatting tool, a data conversion tool, a data correlation tool, a key performance indicator (KPI) generation tool, a data visualization tool, a data adaptor tool for obtaining data from multiple data sources, or an alert tool.

9. The one or more non-transitory computer-readable media of claim 8, where the data visualization tool generates at least one of charts, graphs, maps, or timelines based on at least one of KPI data generated by the KPI generation tool, data obtained by the data adaptor tool, or data obtained via a tool program interface of an additional tool.

10. The one or more non-transitory computer-readable media of claim 1, wherein the acts further comprise receiving status information from the enterprise software platform indicating that a first implemented tool of the one or more implemented tools is implemented on the enterprise software platform, the status information indicating at least one of identification information of the first implemented tool, implementation history of the first implemented tool, version information of the first implemented tool, user log information of the first implemented tool, total run time of the first implemented tool, and crash and error reports provided by the first implemented tool.

11. The one or more non-transitory computer-readable media of claim 1, wherein the acts further comprise:
   updating a status change with respect to the distributed tool virtual marketplace, the status change including receiving a new tool for distribution, receiving a new version of the tool for distribution, or removing the tool from distribution via the distributed tool virtual marketplace; and
   providing a notification of the status change to the end user via an interactive interface of a user application that is implemented on a computing device of the end user.

12. The one or more non-transitory computer-readable media of claim 11, wherein the status change further includes a planned end of support date for the tool.

13. The one or more non-transitory computer-readable media of claim 1, wherein the acts further comprise:
   receiving at least one of a review or a rating for a distributed tool of the one or more e distributed tools or an associated tool of the one or more associated tools; and
   providing the at least one of the review or the rating of the tool for display on an interactive interface of a user application that is implemented on a computing device of the end user.

14. The one or more non-transitory computer-readable media of claim 1, wherein the entity is a wireless communication carrier that delivers telecommunication service to subscribers, a utility company that delivers a utility service to customers, or a financial company that provides financial services to the customers.

15. One or more non-transitory computer-readable media storing computer-executable instructions that upon execution cause one or more processors to provide an interactive user interface for a distributed tool virtual marketplace by performing acts comprising:
   determining, based on state information stored in a state information database and corresponding to an enterprise software platform of an end user, one or more implemented tools currently in use or selected for use on the enterprise software platform;
   determining based on status data stored in a tool status database and corresponding to the one or more implemented tools, one or more dependencies of the one or more implemented tools, each dependency being one of an input dependency and an output dependency, an input dependency corresponding to data or functionality that may be provided to the one or more of the implemented tools, and an output dependency indicating data or functionality that may be provided by the one or more of the implemented tools;
   determining one or more associated tools from the distributed tool virtual marketplace that has at least one dependency relationship with the one or more implemented tools, each dependency relationship being one of an input dependency relationship and an output dependency relationship, an input dependency relationship corresponding to an ability to provide data or functionality corresponding to an input dependency of the one or more implemented tools, and an output dependency relationship corresponding to an ability to use data or functionality corresponding to an output dependency of the one or more implemented tools;
   providing the interactive user interface including providing a menu including the one or more associated tools for display to the user; and
   receiving, from the end user via the menu of the interactive user interface; an acquisition request for an associated tool of the one or more associated tools,
   wherein at least one of the state information database and the tool status database are stored in a computer storage media.

16. The one or more non-transitory computer-readable media of claim 15, wherein providing the interactive user interface further comprises providing the interactive user interface using a user application implemented on a computing device of the end user.

17. The one or more non-transitory computer-readable media of claim 16, wherein determining the one or more associated tools further comprises filtering of the one or more associated tools by at least one of a tool category, a tool subcategory, a tool type, a tool version, a tool deployment location, a reported bug, or a type of dependency relationship.

18. The one or more non-transitory computer-readable media of claim 15, wherein providing the interactive user interface further comprises providing the at least one dependency relationship for display to the end user.

19. The one or more non-transitory computer-readable media of claim 15, wherein the acts further comprise receiving status information from the enterprise software platform indicating that a first implemented tool of the one or more implemented tools is implemented on the enterprise software platform, the status information indicating at least one of identification information of the first implemented tool, implementation history of the first implemented tool, version information of the first implemented tool, user log information of the first implemented tool, total run time of the first implemented tool, and crash and error reports provided by the first implemented tool.

20. The one or more non-transitory computer-readable media of claim 15, wherein the acts further comprise:
   updating a status change with respect to the distributed tool virtual marketplace, the status change including receiving a new tool for distribution, receiving a new version of the tool for distribution, or removing the tool from distribution via the distributed tool virtual marketplace; and
   providing, through the interactive user interface, a notification of the status change to the end user.

21. The one or more non-transitory computer-readable media of claim 15, wherein the acts further comprise:
   receiving at least one of a review or a rating for a distributed tool of the one or more e distributed tools or an associated tool of the one or more associated tools; and
   providing the at least one of the review or the rating of the tool for display to the end user.

* * * * *